US006957894B2

(12) United States Patent
Rabinowitz et al.

(10) Patent No.: US 6,957,894 B2
(45) Date of Patent: Oct. 25, 2005

(54) GROUP ALIGNMENT OF SOLAR CONCENTRATOR MICRO-MIRRORS

(75) Inventors: Mario Rabinowitz, 715 Lakewood Way, Redwood City, CA (US) 94062-3922; Felipe G. Garcia, Sheffield, MA (US)

(73) Assignee: Mario Rabinowitz, Redwood City, CA (US)

( * ) Notice: Subject to any disclaimer, the term of this patent is extended or adjusted under 35 U.S.C. 154(b) by 19 days.

(21) Appl. No.: 10/770,087

(22) Filed: Jan. 31, 2004

(65) Prior Publication Data

US 2005/0168850 A1 Aug. 4, 2005

(51) Int. Cl.[7] .............................................. G02B 7/182
(52) U.S. Cl. ...................... 359/851; 359/853; 359/873; 359/872
(58) Field of Search ............................... 359/296, 291, 359/292, 293, 224, 851, 853, 873, 872, 220, 359/221, 223, 225, 226; 345/107, 84

(56) References Cited

U.S. PATENT DOCUMENTS 5,808,783 A * 9/1998 Crowley ..................... 359/296
6,054,071 A * 4/2000 Mikkelsen, Jr. ............ 264/1.36
6,122,094 A * 9/2000 Silverman ................... 359/296
6,612,705 B1 * 9/2003 Davidson et al. ........... 359/851
6,738,176 B2 * 5/2004 Rabinowitz et al. ........ 359/296

* cited by examiner

*Primary Examiner*—Hung Xuan Dang
*Assistant Examiner*—Tuyen Tra

(57) ABSTRACT

Due to an ever growing shortage of conventional energy sources, there is an increasingly intense interest in harnessing solar energy. The instant invention is concerned with method and apparatus for the group alignment of solar concentrator micro-mirrors and the maximization of the percentage of incident light that is reflected to the receiver. Novel method and apparatus are taught for the alignment in large groups or ensembles of micro-mirrors of a micro-optics solar concentrator system for single-axis and two-axis tracking. Broadly this invention deals with novel concepts used for alignment in the focussing of light wherever mirrors are used for focussing such as for solar propulsion assist, illumination and projection of light, optical switching, etc. A particularly important objective is the focussing of sunlight for solar power conversion and production. The instant invention can contribute to the goal of achieving environmentally clean solar energy on a large enough scale to be competitive with conventional energy sources.

20 Claims, 4 Drawing Sheets

GROUP ALIGNMENT OF SOLAR CONCENTRATOR MICRO-MIRRORS

The following U.S. patents, allowed patent applications, and pending patent applications are fully incorporated herein by reference:

U.S. Pat. No. 6,612,705, by Mark Davidson and Mario Rabinowitz, "Mini-Optics Solar Energy Concentrator" issued on Sep. 2, 2003.

U.S. Publication #2003-0202235-A1, by Mario Rabinowitz and Mark Davidson, "Dynamic Multi-Wavelength Switching Ensemble" allowed on Oct. 6, 2003.

U.S. Publication #2003-0192998, by Mark Davidson and Mario Rabinowitz, "Solar Propulsion Assist" allowed on Nov. 4, 2003.

U.S. Publication #2003-0193726-A1, by Mark Davidson and Mario Rabinowitz, "Active Reflection Illumination And Projection" is Pending.

U.S. Publication #Not Designated Yet, by Mario Rabinowitz, "Alignment Of Solar Concentrator Micro-Mirrors" is Pending.

BACKGROUND OF THE INVENTION

This invention provides a low cost means for achieving affordable solar energy by greatly reducing the cost of solar concentrators which increase (concentrate) the density of solar energy incident on the solar energy converter. A limiting factor in the utilization of solar energy is the high cost of energy converters such as photovoltaic cells. For example, for the purpose of generating electricity, a large area of expensive solar cells may be replaced by a small area of high-grade photovoltaic solar cells operating in conjunction with the inexpensive intelligent micro-optics of this invention. Thus the instant invention can contribute to the goal of achieving environmentally clean energy on a large enough scale to be competitive with conventional energy sources.

The rotatable elements of this invention are mirrored balls and cylinders. As derived in U.S. Pat. No. 6,612,705 of which one inventor of this instant invention is the co-inventor, balls in a square array have a packing fraction of 0.785 and 0.907 in a hexagonal array. Balls have an advantage over cylinders in that they can operate in either a single-axis or two-axis tracking mode. Cylinders have an advantage over balls in that they can have a packing fraction of nearly 1, but they are limited to a single-axis tracking mode. The elements 1 (balls and cylinders) may be individually oriented, or groups may be collectively aligned to simplify tracking and focussing. Different groups are given different orientations to achieve focusing. The number of mirrors per grid cell are a design variable. The voltages can be controlled by a small micro-processor (computer) with analog voltage outputs.

There is a trade-off between complexity of the grid, and size of the voltage source and control system. One element per grid cell is the maximum complexity of the grid and control system, and presents the minimal requirement for the voltage source. Unlike displays that require high resolution, groups of balls may be collectively oriented to simplify tracking and focussing. In the instant invention, separate groups or ensembles of mirrors are individually aligned, while the members of a group all receive approximately the same alignment. When groups are collectively oriented they may have a slight group concavity to aid in the focussing to the collector. The number of layers of balls (mirrors) varies from one layer to a few layers, so the size of the voltage source perpendicular to the layer or layers of balls need not be large. However alignment of large lateral groups of even one layer increases the size of the voltage source since the applied electric field is proportional to the voltage/grid spacing in the lateral direction. In order to affectively align 1 million elements (balls or cylinders) in a lateral layer in the manner of the prior art with a grid spacing 1000 times ($1000^2$=1,000,000) that of one element, a voltage 1000 times V would be needed. V is typically 50 to 150 volts for the alignment of one element, so that 50,000 volts to 150,000 volts would be needed for lateral control in the conventional manner. One object of the instant invention is to align large groups of balls with lateral voltages that are relatively small compared to 1000 volts.

The presence of rotatable mirrors in a solar concentrator presents either a dilemma or an opportunity with respect to the basic nature of the alignment implementation. Mirrors are normally made of a conductive metallic coating. In an applied electrostatic field, E, a dipole moment is induced in the metallic conducting material of the micro-mirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. An induced electrostatic dipole in a pivoted conductor in an electrostatic field is somewhat analogous to an induced magnetic dipole in a pivoted ferromagnetic material in a magnetic field, which effect most people have experienced. When pivoted, a high aspect ratio (length to diameter ratio) ferromagnetic material rotates to align itself parallel to an external magnetic field.

If alignment is attempted in a conventional manner such as is used in Gyricon displays, the induced polarization electric dipole field in a mirror presents a dilemma since it is perpendicular to the zeta potential produced dipole field and the net vector is in neither direction. The "zeta potential," is the net surface and volume charge that lies within the shear slipping surface resulting from the motion of a body through a liquid. The zeta potential is an electrical potential that exists across the interface of all solids and liquids. It is also known as the electrokinetic potential. The zeta potential produces an electric dipole field when a sphere is made from two dielectrically different hemispheres due to their interaction with the fluid surrounding it, with a pole adjacent to each hemisphere. One way to eliminate or greatly diminish the effect of the zeta potential is to make the surface of both hemispheres out of the same material. This would be quite difficult for Gyricon displays because they require optically different surfaces e.g. black and white, or e.g. cyan, magenta, and yellow for color mixing.

The 1998 Gyricon U.S. Pat. No. 5,717,515 of Sheridon, entitled "Canted Electric Fields for Addressing a Twisting Ball Display" is exclusively concerned with Displays. There appears to be no mention of any other application than Displays, either specifically or by general statement. In this Sheridon patent, no mention is made of a mirror in the gyricon balls, nor is there any mention of specular reflection as would be obtained from a mirror. On the contrary, means are discussed to increase diffuse reflection from the balls so the Gyricon display may easily be observed from all angles. Certainly there is no anticipation of a solar concentrator application, mirrored illumination and projection, solar propulsion assist, or any other micro-mirror application. Furthermore there is no mention of coupling means to the balls other than by means of the zeta potential dipole, or an electret dipole both of which are parallel to the Gyricon axis of symmetry which in the case of black and white balls goes through the vertex of the black hemisphere, the center of the sphere, and the vertex of the white hemisphere. Also there is no mention of an induced polarization electric dipole in the balls. An important distinction with respect to the instant invention, is that the Sheridon display patents are not concerned with alignment of large groups of balls. In fact the same alignment of the balls collectively in large groups would be antithetical to display patents since they require high resolution.

This Sheridon U.S. Pat. No. 5,717,515 focuses on different embodiments of "segmented electrodes" for Displays only, without mention of other applications. Nor does it assert that their invention may be applied more broadly. Yet, interestingly, some of the claims are quite general. Since claims should be a summary of the invention described in the specification, it appears that such broad claims are not warranted by the specification. These broad claims seem to conflict with the claims of the prior 1981 Goodrich U.S. Pat. No. 4,261,653, which is also quite specific, and also differs considerably from the instant invention.

The instant invention differs substantially from that of Sheridon and from that of Goodrich in the use of: mirrored balls and cylinders; induced polarization electric dipoles in the mirrors with or without permanent dipoles in electrets; the dipole fields being perpendicular to the axis of symmetry (rather than parallel); the alignment of large groups of balls by means of the use of orthogonally criss-crossed laddered electrodes with widely spaced rung electrodes to provide greater transparency of the active surface than in the Sheridon patent. Furthermore alignment is achieved with less power consumption, i.e. with smaller power supplies than would otherwise be necessary.

The instant invention is primarily concerned with method and apparatus for the group alignment of solar concentrator micro-mirrors. However, it has broader applications wherever mirrors are used for focussing such as for solar propulsion assist, illumination and projection of light, optical switching, etc.

Definitions

"Bipolar" refers herein to either a magnetic assemblage with the two poles north and south, or an electric system with + and − charges separated as in an electret.

"Concentrator" as used herein in general is a micro-mirror system for focussing and reflecting light. In a sollar energy context, it is that part of a solar Collector system that directs and concentrates solar radiation onto a solar Receiver.

"Dielectric" refers to an insulating material in which an electric field can be sustained with a minimum power dissipation.

"Elastomer" is a material such as synthetic rubber or plastic, which at ordinary temperatures can be stretched substantially under low stress, and upon immediate release of the stress, will return with force to approximately its original length. Silicon elastomers are an excellent material within which to embed the mirrored balls or cylinders, because of their durability with respect to ultraviolet light, among other reasons.

"Electret" refers to a solid dielectric possessing persistent electric polarization, by virtue of a long time constant for decay of charge separation.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"ITO" is a conducting alloy of Indium/Tin Oxide that is transparent.

"Laddered Electrodes" herein refers to a ladder like electrode configuration where the ladder legs are the bus bars with widely-spaced electrode rungs such as shown in FIGS. 2*a*, 2*b*, 2*c*, and 2*d*.

"Packing fraction" herein refers to the fraction of an available area occupied by the collection (ensemble) of rotatable elements.

"Receiver" as used herein in general is a system for receiving reflected light. In a solar energy context, it receives concentrated solar radiation from the micro-mirror assembly for the conversion of solar energy into more conveniently usable energy such as electricity.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Zeta potential" is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres with a pole adjacent to each hemisphere.

SUMMARY OF THE INVENTION

There are many objects, aspects, and applications of this invention. Broadly this invention deals with the general concept of method and apparatus for focussing light by using mirrors. A particularly important object is the same alignment in groups of micro-mirrors for the focussing of sunlight in power conversion and production. Accordingly, other aspects and advantages are given below.

A particularly important aspect is to provide a unique tracking and focussing system for solar power conversion.

Another aspect is to provide the options of single-axis tracking or two-axis tracking by the concentrator micro-mirrors for different applications.

Another aspect is to provide a rugged system for conversion of solar energy to heat.

Another aspect is to provide electricity for both mobile and stationary communications systems.

Another aspect is to provide large-scale environmentally clean energy.

Another aspect is to help in the industrialization of developing countries.

Another aspect is to provide a low-cost, tough, light-weight, concentrated high gain solar energy converter that is highly portable.

Another aspect is to provide a minitiarized quasi-planar heliostat field configuration that can track the sun.

Other aspects, objects and advantages of the invention will be apparent in a description of specific embodiments thereof, given by way of example only, to enable one skilled in the art to readily practice the invention as described hereinafter with reference to the accompanying drawings. In accordance with the illustrated preferred embodiments, method and apparatus are presented that are capable of producing group alignment of micro-mirrors for the specular reflection of a source of light such as sunlight.

DETAILED DESCRIPTION OF THE PRESENTLY PREFERRED EMBODIMENTS

Figure 1A:
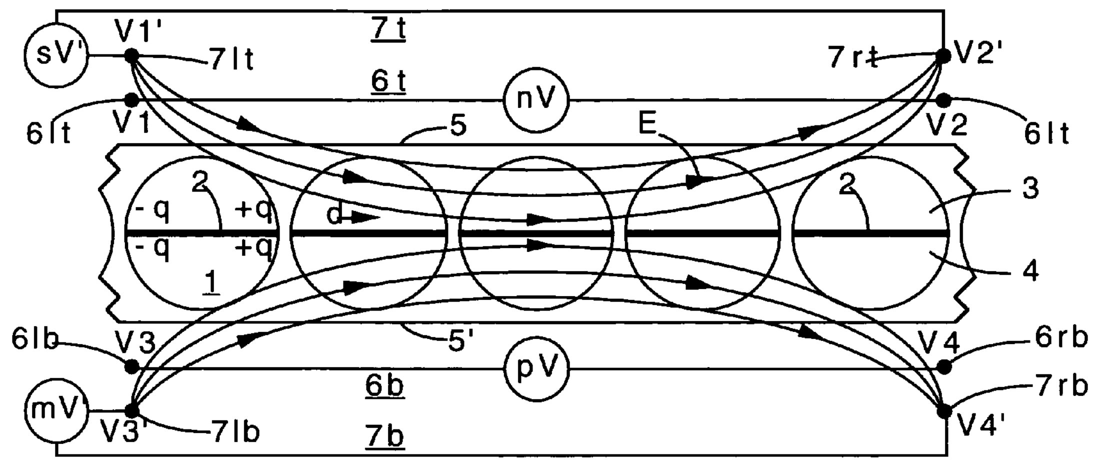
FIG. 1*a* is a cross-sectional view of a group of rotatable elements each with an induced dipole micro-mirror aligned parallel to two pairs of laddered electrodes with electrode rungs so that these elements can be similarly aligned as a group with the application of moderate voltages.

FIG. 1*a* is a cross-sectional view of a group of n (as shown here, n=5) rotatable elements 1 each with an induced dipole micro-mirror 2 with induced charges +q and −q at its ends. There are m≧1 such elements 1 in the same layer, orthogonal to the n elements 1 which are shown. The hemispheres 3 and 4 are made of the same transparent material which minimizes the effect of the zeta potential which has been previously discussed. The elements 1 are coated with a lubricating liquid and immersed in a dielectric of top side 5 and bottom side 5' as described in U.S. Pat. No. 6,612,705. It is necessary for the top hemisphere 3 to be transparent for light to enter and be reflected from micro-mirror 2. The bottom hemisphere 4 may be opaque, preferably with dielectric properties similar to top hemisphere 3 to minimize the effect of the zeta potential.

Superimposed schematically are variable voltage sources nV, mV', pV, and sV' connected to two pairs of laddered electrodes with interlaced rungs as shown in FIGS. 2*a*, 2*b*, 2*c*, and 2*d*. Each member of a pair of interlaced rung electrodes are orthogonal to each other and are insulated from each other so that they criss-cross orthogonally with planes parallel to top side 5. Variable voltage source nV is connected to laddered electrodes with interlaced rungs 6*t*; and voltage source sV' is connected to laddered electrodes with interlaced rungs 7*t* are secured at the top side 5 of the dielectric in which the elements 1 are immersed. Variable voltage source mV' is connected to laddered electrodes with interlaced rungs 7*b* and voltage source pV is connected to laddered electrodes with interlaced rungs 6*b* which are secured at the bottom side 5' of the dielectric in which the elements 1 are immersed.

Figure 2A:
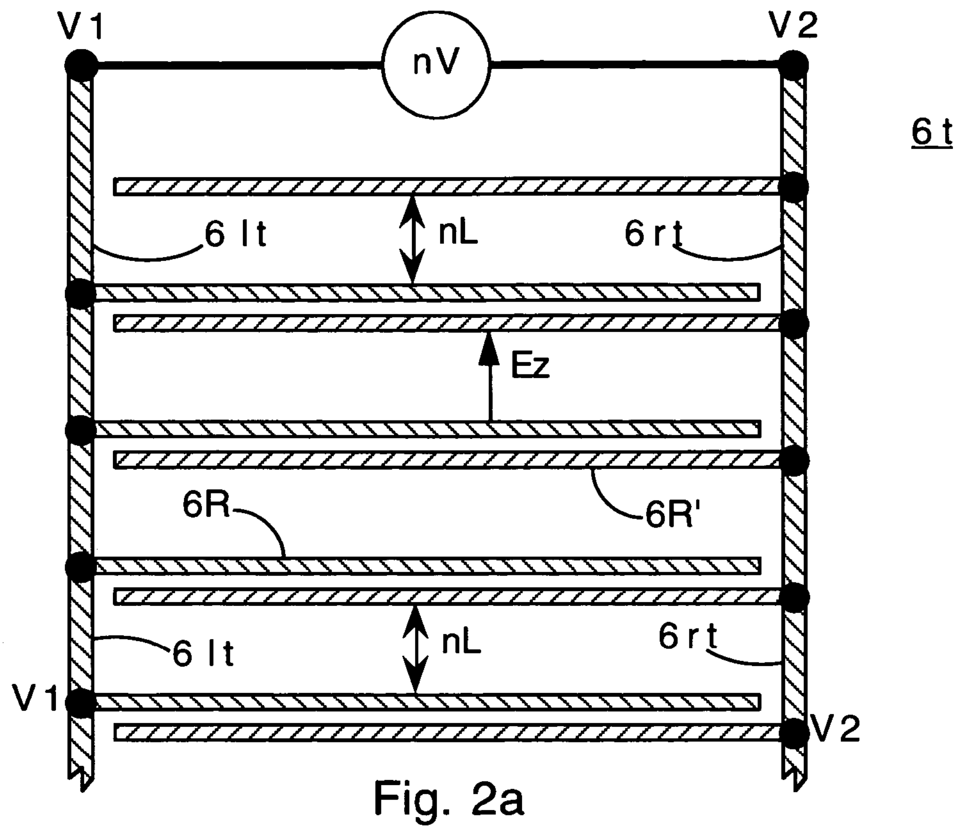
FIG. 2*a* represents a top view of laddered electrodes with an array of electrode rungs in the left-right direction in a plane on top of the mirrored array.

Voltage source nV is shown in the middle corresponding to its middle position in FIG. 2*a*. Voltage source mV' is shown to the left corresponding to its left position in FIG. 2*b*. Voltage source pV is shown in the middle corresponding to its middle position in FIG. 2*c*. Voltage source sV' is shown to the left corresponding to its left position in FIG. 2*d*.

Figure 2B:
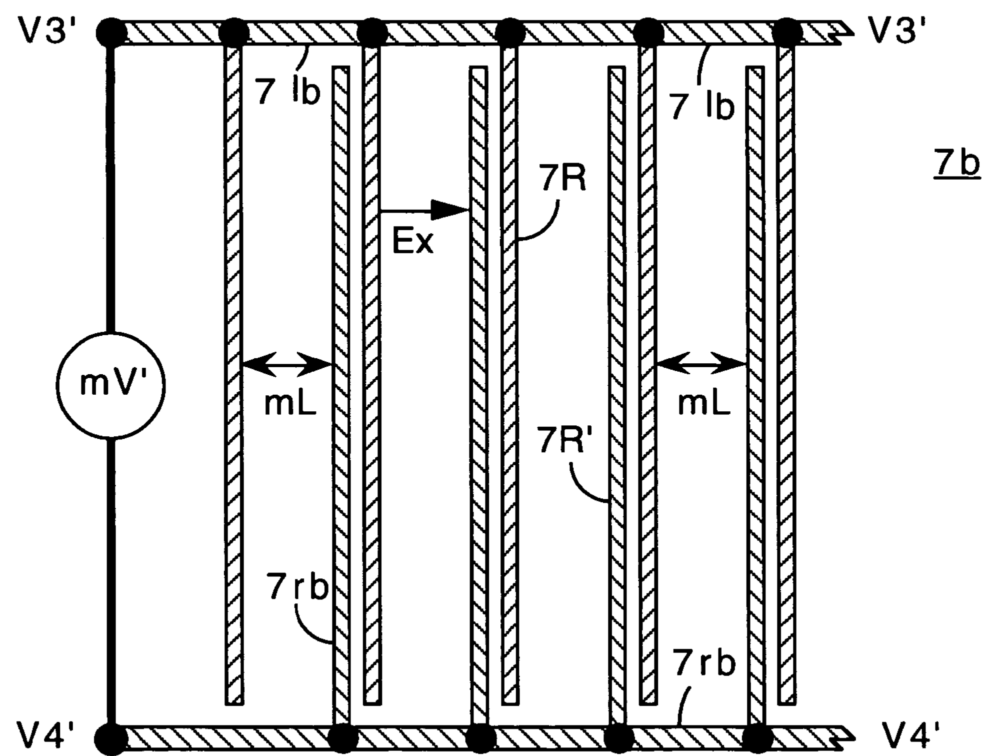
FIG. 2*b* represents a top view of laddered electrodes with an array of electrode rungs in the fore-aft (orthogonal to left-right) direction in a plane below the mirrored array.
Figure 2C:
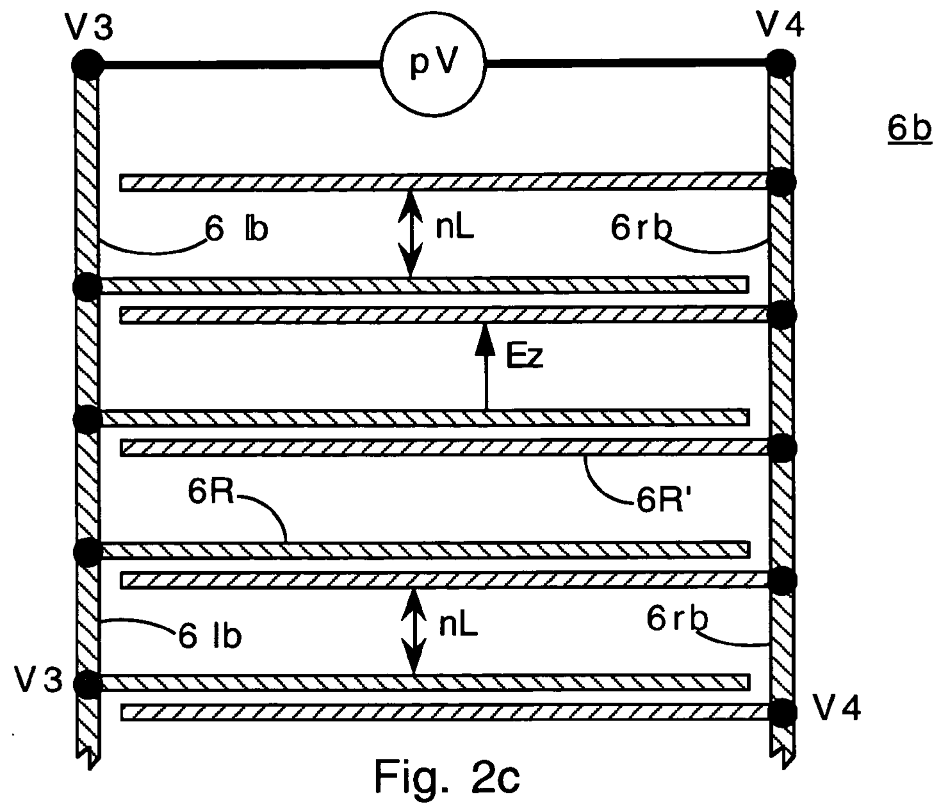
FIG. 2*c* represents a top view of laddered electrodes with an array of electrode rungs in the left-right direction in a plane below the mirrored array.
Figure 2D:
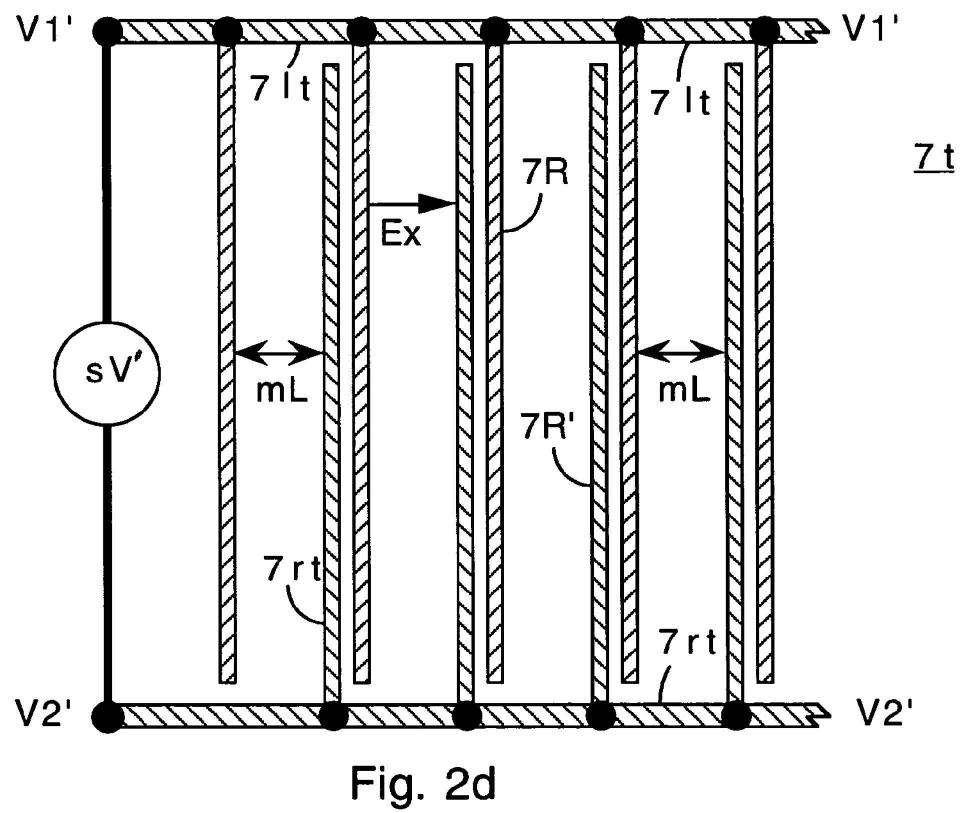
FIG. 2*d* represents a top view of laddered electrodes with an array of electrode rungs in the fore-aft (orthogonal to left-right) direction in a plane on top of the mirrored array.

The micro-mirror 2 is shown aligned parallel to top side 5 above element 1. These electrodes 6*t* and 7*t* are a pair of electrodes whose planes are parallel, and whose rung electrodes 6R, 6R', 7R and 7R' are at right angles to each other as shown in FIGS. 2*a* and 2*d*. The right top bus bar of laddered electrode 6*t* is labeled 6*rt* and the left top bus bar is 6*lt*. The right top bus bar of laddered electrode 7*t* is labeled 7*rt* and the left top bus bar is 7*lt*. Lying below elements 1 secured to bottom side 5' with planes parallel to laddered electrodes 6*t* and 7*t* are a similar pair of laddered electrodes 6*b* and 7*b* similarly at right angles to each other with right bottom bus bar labeled 6*rb*, left bottom bus bar 6*lb*, right bottom bus bar labeled 7*rb*, and left bottom bus bar 7*lb*. These electrodes 6*b* and 7*b* are similar to electrodes 6*t* and 7*t* with interlaced electrode rungs 6R, 6R', 7R, and 7R' as shown in FIGS. 2*b* and 2*c*. All laddered electrodes are insulated from each other. An ensemble of such elements 1 can thus be aligned as a group with the application of moderate voltages on the electrode rungs 6R, 6R', 7R and 7R' via the bus bars. This assembly of electrodes and groups of mirrored elements 1 repeats in the lateral direction, with each group being capable of independent different alignment.

The xz plane of the array or layer of elements 1 is perpendicular to the xy plane of this paper. The planes of the laddered electrodes 6*t*, 7*t*, and 7*b*, are also in the xz plane. The planes of the laddered electrodes are all insulated from each other, as are adjacent rungs. As will be described, electric field components $E_x$ and $E_z$ are created by suitable voltage differences between the electrode rungs 6R, 6R', 7R and 7R' in their planes. A micro-processor sends signals via the bus bars to establish voltages from a voltage source to each laddered electrode. In this embodiment, the electric field component $E_y$ is established by suitable voltage differences between the laddered electrodes 6*t*, 7*t*, 6*b*, and 7*b*, i.e. between their planes. To augment the $E_y$ component, a separate means of producing $E_y$ will be described in conjunction with FIGS. 3*a* and 3*b*.

As we shall shortly see, these two pairs of laddered electrodes (i.e. 4 laddered electrodes) are sufficient to produce any desired alignment (orientation) of each mirror 2. Additional laddered electrodes may be added if desired; however, two pairs of laddered electrodes are sufficient and are a presently preferred embodiment. In this FIG. 1*a*, the orientation of each mirror 2 is parallel to the planes of the laddered electrodes 6t, 6b, 7t and 7b, as are the main components of the electric field E. As shown the main $E_x$ component (horizontal) of E decreases as one goes out from the middle. In a solar concentrator this is not as critical as in a display, but can be compensated for by having an electret added to the outer most balls as described in conjunction with FIG. 4.

An ensemble of such elements 1 and laddered electrodes are a major constituent of a micro-optics concentrator. One inventor of this instant invention is the co-inventor of U.S. Pat. No. 6,612,705, in which the micro-optics concentrator is described in detail, including a detailed description of the dielectric and lubricating liquid in which the elements 1 are immersed. Each micro-mirror 2 is a shiny circular flat conducting metal at the equatorial plane of element 1. The laddered electrodes and other types of electrodes are discussed in conjunction with FIGS. 2a, 2b, 2c, and 2d. A micro-processor sends signals via bus bars to establish voltages from a voltage source to the rungs 6R, 6R', 7R and 7R'. For top laddered electrode 7t, the left corner is at voltage V1' and the right corner is at voltage V2'. For the bottom laddered electrode 7b, the left corner is at voltage V3' and the right corner is at voltage V4'. For the sandwiched in-between top laddered electrode, the left corner is at voltage V1 and the right corner is at voltage V2. For bottom laddered electrode of this pair, the left corner is at voltage V3 and the right corner is at voltage V4. A signal sets the voltages so that V1'>V2', V1=V2 and V3'>V4', V3=V4 to produce a roughly uniform applied electric field E with main components parallel to top side 5 and the laddered electrodes as shown. As can be seen in this figure, the symmetry of the applied electric field is such that the effects on the alignment of the mirror 2 of the components non-parallel to the mirror plane tend to cancel out.

With the laddered electrodes, one may use ordinary inexpensive conducting materials like aluminum, copper, etc. The laddered electrodes do not need to be transparent as in the Sheridon U.S. Pat. No. 5,717,515, in the Goodrich U.S. Pat. No. 4,261,653, and in display patents in general, since they may be widely spaced thin wires that do not occlude the mirrors. Because the electrodes in the instant invention are thin and far apart, they cause only a small amount of shadowing. The laddered electrodes also do not need to be of high resistivity as in the Sheridon U.S. Pat. No. 5,717,515 and other display patents, since they support an electric field across the dielectric medium, and do not have to support an electric field across themselves as do the display devices. The laddered electrodes of the instant invention represent a clear economic and technological advantage over that of display devices which must all use a transparent conductor like ITO for their electrodes. ITO (Indium/Tin Oxide) is both expensive and difficult to apply since it must be sputtered on the sheets that contain the elements 1 to form the addressing electrodes of the prior art.

Examples of materials that are appropriate transparent dielectrics for making the elements 1 are: glass, polycarbonate, acrylic polymers made from acrylic derivatives such as acrylic acid, methacrylic acid, ethyl acrylate, methyl acrylate, polyethylene (some trade names are lexan, lucite, plexiglass, etc.). Although polyethylene is an opaque whitish material, it is somewhat transparent in thin cross-section. Glass is a preferred material both because of its transparency, durability, and low cost.

The applied electric field E induces a dipole moment in the metallic conducting material of the micro-mirrors 2. This is because when a metallic conductor is placed in an electric field, the charge distributes itself so as to produce a field free region inside the conductor. To internally cancel the applied field E, negative-free electrons move to the end of each conducting micro-mirror 2 opposite to the direction of E, leaving positive +charge at the end in the direction of E. The torque interaction of the induced electric dipole moment of the micro-mirrors 2 and the applied electric field E acts to align the micro-mirrors 2 parallel to the electric field E as shown here in FIG. 1a. The torque is proportional to the product of E and the dipole moment.

In operating by means of an induced polarization dipole field, the instant invention operates by a substantially different mechanism than in Gyricon displays. The instant invention also differs substantially from Gyricon displays in terms of the axis of symmetry of the elements 1, i.e. the balls or cylinders. In Gyricon displays, the axis of symmetry of their balls and cylinders is parallel to the applied electric field since the zeta potential dipole is parallel to the applied electric field. In the instant invention, the axis of symmetry of the elements 1 is perpendicular to the applied electric field because the micro-mirrors 2 and hence the induced polarization dipole field is perpendicular to the axis of symmetry. It should be noted that here in FIG. 1a, the electric field E orientation is at right angles to that which is used in Gyricon displays. Here E is parallel to the equatorial plane of the balls and the top surface which admits light. In traditional Gyricon displays, E is perpendicular to the Gyricon ball equatorial plane and to the top surface—the viewing surface which admits light.

Figure 1B:
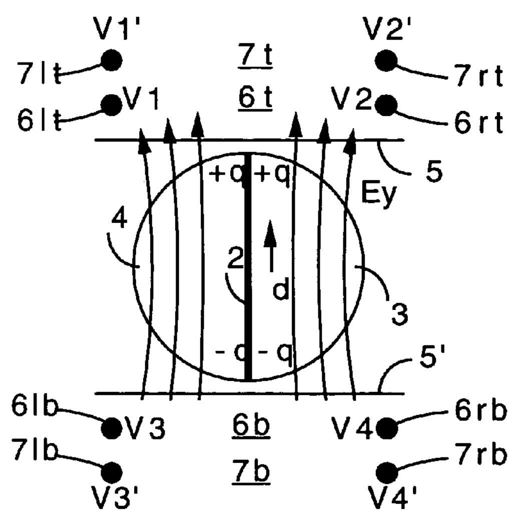
FIG. 1*b* is a cross-sectional view of a rotatable element with an induced dipole micro-mirror aligned perpendicular to two pairs of laddered electrodes with electrode rungs. An ensemble of such elements can thus be aligned as a group with the application of moderate voltages.

FIG. 1b is a cross-sectional view of one element 1 of a group of n (as shown in FIG. 1a, n=5) rotatable elements 1 each with an induced dipole micro-mirror 2 with induced charges +q and −q at its ends. The hemispheres 3 and 4 are made of the same transparent material which minimizes the effect of the zeta potential which has been previously discussed. The elements 1 are coated with a lubricating liquid and immersed in a dielectric of top side 5 and bottom side 5' as described in U.S. Pat. No. 6,612,705. It is necessary for the top hemisphere 3 to be transparent for light to enter and be reflected from micro-mirror 2. The bottom hemisphere 4 may be opaque, preferably with dielectric properties similar to top hemisphere 3 to minimize the effect of the zeta potential.

Figure 1C:
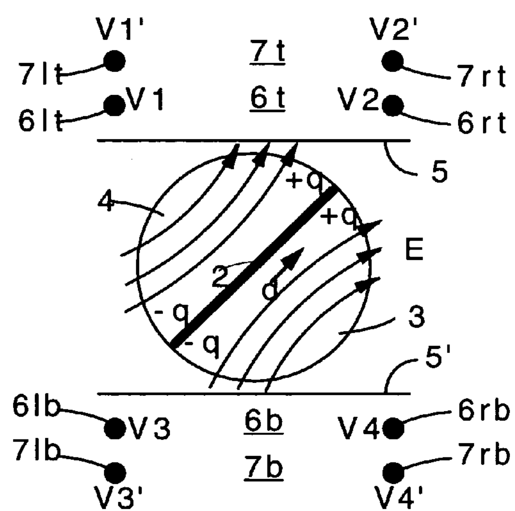
FIG. 1*c* is a cross-sectional view of a rotatable element with an induced dipole micro-mirror aligned at a tilted angle with respect to two pairs of laddered electrodes with electrode rungs. An ensemble of such elements can thus be aligned as a group with the application of moderate voltages.
Figure 3A:
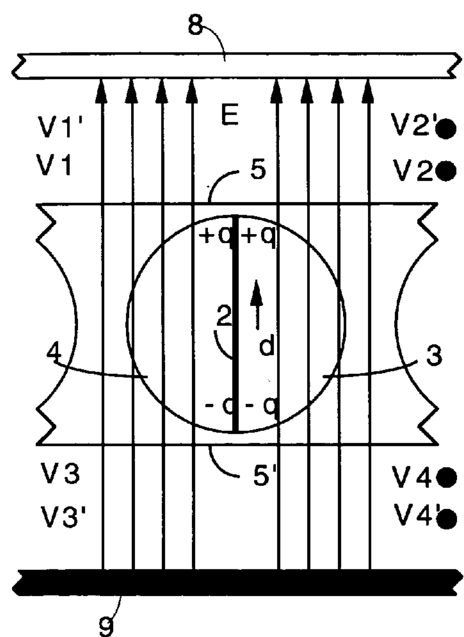
FIG. 3*a* is a cross-sectional view of a group of induced dipole micro-mirrored elements beween two pairs of laddered electrodes with electrode rungs, which are sandwiched between a transparent top plate electrode and a bottom plate electrode.
Figure 3B:
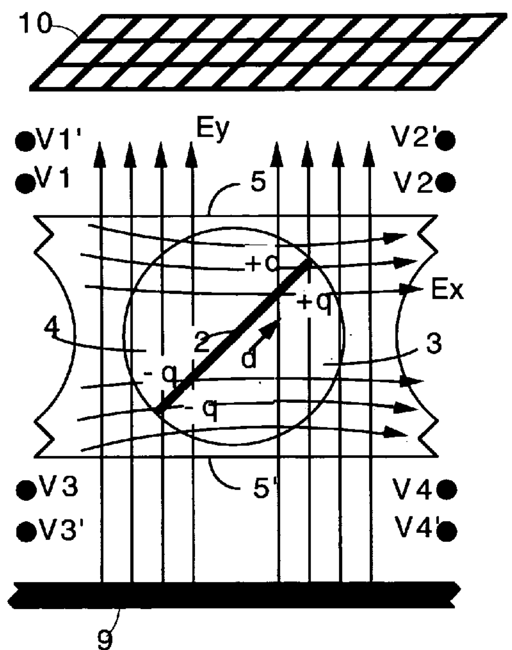
FIG. 3*b* is a cross-sectional view of a group of induced dipole micro-mirrored elements beween two pairs of laddered electrodes with electrode rungs, which are sandwiched between a wide grid top electrode and a bottom plate electrode.

Variable voltage sources nV, mV', pV, and sV' are connected to two pairs of laddered electrodes with interlaced rungs as shown in FIG. 1a, and as also shown in FIGS. 2a, 2b, 2c, and 2d. The plane of the micro-mirror 2 is parallel to the main component of the electric field E, which is perpendicular to the planes of the laddered electrodes. A micro-processor signal sets the voltages so that V3>V1, V3'>V1', V4>V2, V4'>V2', V3=V4, V1=V2, V3'=V4', V1=V2 produce a roughly uniform applied electric field $E_y$ with main components perpendicular to the planes of the laddered electrodes as shown. Not much usable incident and reflected light is available with the mirror in the vertical position as shown. The main purpose of this FIG. 1b is to illustrate the establishment of a vertical electric field $E_y$ in the y-direction can be produced this way, with the alignment of the mirror in this y-direction. The next figure, FIG. 1c, shows the net tilted field resulting from the vector sum of fields $E_y$ shown here, and $E_x$ shown in FIG. 1a. A preferable embodiment for producing the $E_y$ field is shown in FIGS. 3a and 3b, of which the embodiment of FIG. 3b is the more preferable.

As can be seen in this figure, FIG. 1b, the symmetry of the applied electric field is such that the effects on the alignment of the mirror 2 of the components non-parallel to the mirror plane tend to cancel out. Other groups can be given different alignments by similar method and apparatus as taught in the instant invention.

FIG. 1*c* is a cross-sectional view of one element 1 of a group of n (as shown in FIG. 1*a*, n=5) rotatable elements 1 each with an induced dipole micro-mirror 2 with induced charges +q and −q at its ends. The hemispheres 3 and 4 are made of the same transparent material which minimizes the effect of the zeta potential which has been previously discussed. The elements 1 are coated with a lubricating liquid and immersed in a dielectric of top side 5 and bottom side 5' as described in U.S. Pat. No. 6,612,705. It is necessary for the top hemisphere 3 to be transparent for light to enter and be reflected from micro-mirror 2. The bottom hemisphere 4 may be opaque, preferably with dielectric properties similar to top hemisphere 3 to minimize the effect of the zeta potential.

Variable voltage sources nV, mV', pV, and sV' are connected to two pairs of laddered electrodes with interlaced rungs as shown in FIG. 1*a*, and as also shown in FIGS. 2*a*, 2*b*, 2*c*, and 2*d*. The plane of the micro-mirror 2 is in alignment with the main components of the electric field E, at a tilted angle with respect to the planes of the top laddered electrodes. All laddered electrodes are insulated from each other. A micro-processor signal sets the voltages so that V1'>V2', V2=V1 and V3'>V4', V3=V4 to produce a roughly uniform applied electric field E with main component tilted with respect to the planes of the laddered electrodes as shown. As can be seen in this figure, the symmetry of the applied electric field is such that the effects on the alignment of the mirror 2 of the components non-parallel to the mirror plane tend to cancel out. Other groups can be given different alignments by similar method and apparatus as taught in the instant invention.

The micro-mirrors 2 align themselves parallel to the electric field E due to the induced dipole field polarization of the mirrors. For balls, two-axis tracking is possible. Cylinders would be restricted to single-axis tracking. The chosen alignment angle i.e. tilt angle of the rotatable elements 1 can be held in place by mechanical pressure or electrstatic forces between a net charge on an element 1 and its image charge in the dielectric. Thus during the interval between alignments, the alignment voltages may be switched off to conserve power. As described in U.S. Pat. No. 6,612,705 (of which one of the present inventors is a co-inventor), a plenum can be used to slightly force the containment dielectric apart, as well as other means to free the elements 1 when a new alignment is desired.

Let us now look at various possible embodiments of the instant invention for the addressing electrodes. The different configurations shown, and combinations of them can operate to align the elements 1 and track the sun, or other light source in a non-solar application.

FIG. 2*a* represents a top view of top laddered electrodes 6*t* with a left bus bar 6*lt* showing an array of horizontal electrode rungs 6R all at voltage V1 connected to the variable voltage source nV. Connected to the other polarity of the variable voltage source nV is a right bus bar 6*rt* with an array of horizontal interlaced electrode rungs 6R' all at voltage V2. The two sets of interlacing electrode rungs 6R and 6R' are in close proximity and insulated from each other with gap g. The interlacing of electrodes 6R and 6R' provides for an electric field between them that becomes more approximately uniform with the addition of another similar pair of ladder electrodes as previously discussed. The plane of this laddered electrode 6*t* is on top of the dielectric.

The spacing between the interlaced rung electrodes of opposite polarity is nL with voltage nV across them, where n≧1 (for example, n could be 50) is the number of elements 1 between any pair of adjacent rung electrodes 6R. Thus the average value of the electric field $E_z$ between any two rung electrodes is $E_z$= nV/nL=V/L. This is the same value of electric field $E_y$ that is applied from top to bottom across one layer of elements 1 (balls or cylinders). Similarly in FIG. 2*b*, the average value of the electric field $E_z$ between any two rung electrodes is $E_z$= mV/mL=V/L. This is the same value of electric field $E_y$ that is applied from top to bottom across one layer of elements 1 (balls or cylinders). Since the array of orthogonally criss-crossing interlaced electrode rungs repeats itself r times (as much as desired), a large ensemble of elements 1 r×n×m can be controlled by relatively small voltages nV and mV.

There may be as many pairs of adjacent rung electrodes as needed to control one module of elements 1, so that the variable voltage source nV can easily control millions to billions of balls of ~100 microns (0.1 mm) in diameter in the direction somewhat parallel to the plane of the laddered electrodes 6*t* and somewhat perpendicular to the direction of the rung electrodes 6R. The electric field $E_z$ is shown pointing in the z direction for V2>V1.

FIG. 2*b* represents a top view of top laddered electrodes 7*t* with a left bus bar 7 lt showing an array of horizontal electrode rungs 7R all at voltage V1' connected to the variable voltage source mV'. Connected to the other polarity of the variable voltage source mV' is a right bus bar 7*rt* with an array of horizontal interlaced electrode rungs 7R' all at voltage V2'. The two sets of interlacing electrode rungs 7R and 7R' are in close proximity and insulated from each other with gap g. The interlacing of electrodes 7R and 7R' provides for an electric field between them that becomes more approximately uniform with the addition of another similar pair of ladder electrodes as previously discussed. The plane of this laddered electrode 7*t* is on top of the dielectric.

The spacing between the interlaced rung electrodes of opposite polarity is mL with voltage mV across them, where m≧1 (for example, m could be 100) is the number of elements 1 between any pair of adjacent rung electrodes 6R. Thus the average value of the electric field $E_x$ between any two rung electrodes is $E_x$= mV/mL=V/L. This is the same value of electric field that is applied from top to bottom across one layer of elements 1 (balls or cylinders).

There may be as many pairs of adjacent rung electrodes as needed to control one module of elements 1 so that the variable voltage source mV' can easily control millions to billions of balls of −100 microns (0.1 mm) in diameter in the direction somewhat parallel to the plane of the laddered electrodes 7*t* and somewhat perpendicular to the direction of the rung electrodes 7R. The electric field $E_x$ is shown pointing horizontally to the right in the +x direction for V3'>V4'.

FIG. 2*c* is a top view of laddered electrode 6*b* which is similar to 6*t* of FIG. 2*a*, but with the variable voltage source pV that applies voltages V3 and V4 on the bus bars 6*lb* and 6*rb* to also produce an electric field $E_z$ between any two rung electrodes $E_z$=nV/nL=V/L. The plane of this laddered electrode 6*b* is below the dielectric.

FIG. 2*d* is a top view of laddered electrode 7*t* which is similar to 7*b* of FIG. 2*b*, but with variable voltage source sV' that applies voltages V1' and V2' on the bus bars 7*lb* and 7*rb* to also produce an electric field $E_x$ between any two rung electrodes $E_x$=mV/mL=V/L. The plane of laddered electrode 7*t* is on top of the dielectric.

FIG. 3*a* is a cross-sectional view of a group of n=5 elements 1 with induced dipole micro-mirrors 2 beween two pairs of laddered electrodes with interlaced electrode rungs such as 6*t* and 7*t* such as are shown in FIGS. 2*a*, 2*a*, 2*c*, and 2*d*. As previously described, a micro-processor sends signals via bus bars in the laddered electrodes with interlaced electrode rungs to produce a horizontal roughly uniform applied electric field $E_x$ with main components parallel to the laddered electrodes as shown. As can be seen in this figure, the symmetry of the applied electric field is such that the effects on the alignment of the mirror 2 of the components non-parallel to the mirror plane tend to cancel out. These two pairs of laddered electrodes with interlaced electrode rungs are sandwiched between a transparent (ITO) top plate electrode 8 and a bottom plate electrode 9 which are used to create a vertical approximately uniform electric field $E_y$ as shown. To avoid cluttering the figure, the net applied electric field which is the vector sum of $E_x$ and $E_y$ is not shown. However the plane of the micro-mirrors 2 aligns itself with the direction of the net applied electric field as indicated by the tilt of the mirrors 2. This embodiment is the presently penultimately preferred way of producing the vertical electric field $E_y$ since it results in an approximately more uniform field in the vertical direction. However, if the number of balls n is not too large, the vertical field $E_y$ produced by the pairs of laddered electrodes with interlaced electrode rungs may even have a slight advantage in giving the small group of n mirrors a slight concavity which can help them focus onto the receiver. Since ITO is relatively expensive, the top transparent plate electrode 9, may be replaced with a widely-spaced grid electrode as shown in FIG. 3*b*.

FIG. 3*b* is a cross-sectional view of one element 1 of a group of n (as shown in FIG. 3*a*, n=5) rotatable elements 1 with induced dipole micro-mirrors 2 between two pairs of laddered electrodes with interlaced electrode rungs such as are shown in FIGS. 2*a*, 2*b*, 2*c* and 2*d*. As previously described, a micro-processor sends signals via bus bars in the laddered electrodes with interlaced electrode rungs to produce a horizontal roughly uniform applied electric field $E_x$ with main components parallel to the laddered electrodes as shown. As can be seen in this figure, the symmetry of the applied electric field is such that the effects on the alignment of the mirror 2 of the components non-parallel to the mirror plane tend to cancel out. These two pairs of laddered electrodes with interlaced electrode rungs are sandwiched between a widely-spaced grid top electrode 10 (with grid gap>100 times the grid wire diameter) and a bottom plate electrode 9 which are used to create a vertical approximately uniform electric field $E_y$ as shown. To avoid cluttering the figure, the net tilted applied electric field which is the vector sum of $E_x$ and $E_y$ is not shown. However the plane of the micro-mirrors 2 aligns itself with the direction of the net applied electric field as indicated by the tilt of the mirrors 2. This embodiment is the presently preferred way of producing the vertical electric field $E_y$ since it results in an approximately more uniform field in the vertical direction; and offers a great deal of transparency without the expense associated with ITO. If the number of balls n is not too large, the vertical field $E_y$ produced by the pairs of laddered electrodes with interlaced electrode rungs may even have a slight advantage in giving the small group of n mirrors a slight concavity which can help them focus onto the receiver.

Figure 4:
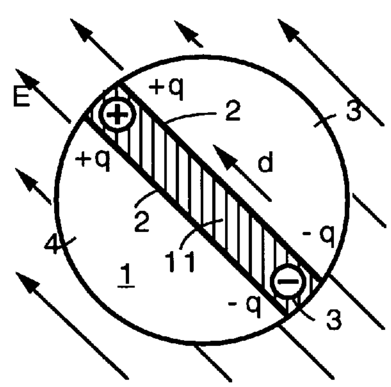
FIG. 4 is a cross-sectional view of a rotatable element with an electret dipole sandwiched between induced dipole micro-mirrors aligned at a tilted angle.

FIG. 4 is a cross-sectional view of a rotatable element 1 with an electret 11 dipole sandwiched between induced dipole micro-mirrors 2 aligned at a tilted angle in the direction of the applied electric field E. The micro-mirrors 2 align themselves parallel to the electric field E due to the induced dipole field polarization of the mirrors, and permanent dipole of the electret 11. The control laddered electrodes with interlaced electrode rungs are not shown here. However, the application of the electric field is accomplished by them as described and understood in FIGS. 1, 2, 3, and 4. The electret 11 is used to augment the torque. In equilibrium i.e. when the rotation is complete, the polarization due to the electret 11 and that due to the induced charges of the conducting micro-mirrors 2 add together to produce a total dipole moment d parallel to the micro-mirrors 2, and parallel to the applied electric field E, which is greater than that of the induced dipole in the mirror. This torque augmentation can help align those balls in regions where the net applied electric field is low due to non-negligible canceling electric field components that are not parallel to the plane of the mirror 2.

Operational Issues, Advantages, and Modes

Method and apparatus have been described for a novel way of controlling the alignment (orientation) of an entire group of elements 1 (balls or cylinders) by means of a set of laddered electrode arrays such as 6*t* and 7*t* with interlaced rung electrodes 6R, 7R, etc. (cf. FIGS. 2*a*, 2*b*, etc.). Another set of laddered electrode arrays with interlaced rung electrodes at another location of the solar concentrator or other similar device, can control another group to a different alignment of the elements 1 each with a micro-mirror 2. Laddered electrode arrays with interlaced rung electrodes have the advantage of providing great transparency since the electrodes have a small cross section with most of the light passing through the large gaps between them. So another advantage provided by the electrode configurations of the instant invention is that expensive ITO as is used in displays need not be used here, eliminating an otherwise expensive component from our system. Furthermore, a high resistivity conductor as is used in displays is also not needed here.

As shown in FIGS. 1*a*, 1*b*, and 1*c*, the laddered electrodes 6*t*, 6*b*, 7*t* and 7*b* with interlaced electrode rungs 6R, 6R', 7R, and 7R' are above and below the elements 1. These laddered electrodes 6*t*, 6*b*, 7*t*, and 7*b* with interlaced electrode rungs 6R, 6R', 7R, and 7R' may also be brought in close to each other near the center plane of the dielectric in which the elements 1 are immersed. This is done when it is desirable to give them additional protection, and/or affect the electric field that is produced.

An electric field vector has 3 components $E_x$, $E_y$, & $E_z$ in each of the spatial directions x, y, and z. Each component can be controlled with one voltage source, although one may use a separate voltage source such as nV and mV' for each of the laddered electrode arrays such as 6*t* and 7*t* in FIGS. 2*a* and 2*b*. The electric fields $E_x$ and $E_y$ shown in FIGS. 2*a* and 2*b* have relatively small symmetrical components in the + and − z directions whose effects on the mirrors tend to cancel. There is a small additive effect of these components with the applied $E_z$ electric field which can be compensated for. Even if the micro-mirrors do not tend to align precisely in the desired direction from the predetermined applied electric field for any reason, fine tuning of the alignment can be done with feedback control directly from the solar photovoltaic receiver, and/or a much more sensitive photomultiplier attached to the receiver. However, with the $E_z$ electric field produced just by the top pair acting in combination with the bottom pair of laddered electrode arrays, the field becomes more non-uniform the further one goes on either side of the center of symmetry in the x and y directions i.e. the central element 1. Although this feature could help produce slight concavity, it need not be relied upon. This makes it desirable to entirely or partially produce the $E_z$ electric field by independent means to be described in conjunction with FIGS. 4*a* and 4*b*.

The alignment (aiming) accuracy of the mirrors is not critical for a 10× concentration factor, and this would still give a large economic benefit. Although the higher the aiming accuracy the better. For a 10× concentration factor, the required accuracy range varies from a minimum of about 9 degrees to a maximum of about 16 degrees, which is not difficult to achieve.

It is preferable to have as close a gap g spacing between interlaced rung electrodes as possible. This is likely to determine the maximum electric field that is present i.e. the breakdown field or breakdown voltage that one must stay below in the choice of voltages, geometries, and gaps since all three enter into electrical breakdown. It is well known that higher electric fields E can be sustained for small gaps g than for large gaps which is advantageous here.

There is a trade-off between complexity of the grid, and size of the power supply and control system. One element per grid cell is the maximum complexity of the grid and control system, and presents the minimal requirement for the power supply. Unlike displays that require high resolution, an important advantage of the instant invention is that groups of balls may be collectively oriented to simplify tracking and focussing without appreciably increasing the size of the voltage source (power supply).

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

What is claimed is:

1. An electric assembly for a micro-optics solar concentrator, the apparatus comprising:

a) an array of micro-mirrors rotatably disposed in a substrate;

b) electric dipoles in said rotatable micro-mirrors;

c) said apparatus having a plurality of addressable elements;

d) two bus bars connected to opposite poles of a voltage source;

e) at least two sets of opposite rung electrodes which interlace orthogonally within each plane, and criss-cross each other and are separated by dielectrics;

f) said rung electrodes electrically connected to at least two of said bus bars for electric field group coupling to said electric dipoles by means of said voltage source; and g) microprocessor means for selectively addressing each pair of said bus bars.

2. The apparatus of claim 1, wherein there are at least three independent voltage sources connected to at least three pairs of rung electrodes.

3. The apparatus of claim 1, wherein said array of micro-mirrors are disposed between a top transparent electrode opposite a bottom electrode connected to an independent voltage source.

4. The apparatus of claim 1, wherein said array of micro-mirrors are disposed between a top grid electrode opposite a bottom electrode connected to an independent voltage source.

5. The apparatus of claim 1, wherein said electric dipoles are induced in each of said micro-mirrors by said electric field.

6. The apparatus of claim 1, wherein an electret is placed adjacent to each micro-mirror so that its permanent electric dipole is parallel to said electric dipole.

7. The apparatus of claim 1, wherein a group of said micro-mirrors are given the same alignment.

8. A method of aligning groups of an array of rotatable mini-mirrors in a light modulating apparatus comprising the steps of:

a) selectively inducing an electric dipole in each of said rotatable mini-mirrors;

b) producing a grid array of independently orientable electric fields for coupling to the induced electric dipoles by means of sets of orthogonally criss-crossing opposing rung electrodes; and c) selectively aligning at least one of said rotatable mini-mirrors by means of said electric fields.

9. The method of claim 8 further comprising the step of applying at least three independent voltages to at least three pairs of rung electrodes.

10. The method of claim 8 further comprising the step of placing an electret adjacent to each mini-mirror so that its permanent electric dipole is parallel to said induced electric dipole.

11. The method of claim 8 further comprising the step of energizing a top transparent electrode opposite a bottom electrode connected to an independent voltage source, between which electrodes are disposed in said array of micro-mirrors.

12. The method of claim 8 further comprising the step of energizing a top grid electrode opposite a bottom electrode connected to an independent voltage source, between which electrodes are disposed in said array of micro-mirrors.

13. The method of claim 8 further comprising the step of giving said mini-mirrors the same alignment as a group.

14. Apparatus for focussing and directing reflected light comprising:

a) an array of micro-mirrors rotatably disposed in a substrate;

b) electric dipoles in said rotatable micro-mirrors;

c) said apparatus having a plurality of addressable elements;

d) two bus bars connected to opposite poles of a voltage source;

e) at least two sets of orthogonally criss-crossing rung electrodes electrically connected to at least two of said bus bars for electric field group coupling to said electric dipoles; and f) microprocessor means for selectively addressing each pair of said bus bars; and g) means for selectively establishing independent voltage differences between each pair of said bus bars by means of said voltage source.

15. The apparatus of claim 14, wherein there are at least three independent voltage sources connected to at least three pairs of rung electrodes.

16. The apparatus of claim 14, wherein said array of micro-mirrors are disposed between a top transparent electrode opposite a bottom electrode connected to an independent voltage source.

17. The apparatus of claim 14, wherein said array of micro-mirrors are disposed between a top grid electrode opposite a bottom electrode connected to an independent voltage source.

18. The apparatus of claim 14, wherein said electric dipoles are induced in each of said micro-mirrors by said electric field.

19. The apparatus of claim 14, wherein an electret is placed adjacent to each micro-mirror so that its permanent electric dipole is parallel to said electric dipole.

20. The apparatus of claim 14, wherein a group of said micro mirrors are given a small optical concavity.

* * * * *